US012581248B2

(12) United States Patent
Guo et al.

(10) Patent No.: US 12,581,248 B2
(45) Date of Patent: Mar. 17, 2026

(54) HEARING AID COMPRISING A COMBINED FEEDBACK AND ACTIVE NOISE CANCELLATION SYSTEM

(71) Applicant: Oticon A/S, Smørum (DK)

(72) Inventors: Meng Guo, Smørum (DK); Anders Meng, Smørum (DK); Daniel Plewe, Smørum (DK); Jakob Sloth Lauridsen, Smørum (DK); Mirjana Adnadjevic, Ballerup (DK); Mojtaba Farmani, Smørum (DK); Nels Hede Rohde, Smørum (DK); Adel Zahedi, Smørum (DK)

(73) Assignee: Oticon A/S, Smørum (DK)

( * ) Notice: Subject to any disclaimer, the term of this patent is extended or adjusted under 35 U.S.C. 154(b) by 314 days.

(21) Appl. No.: 18/343,766

(22) Filed: Jun. 29, 2023

(65) Prior Publication Data

US 2024/0007802 A1 Jan. 4, 2024

(30) Foreign Application Priority Data

Jun. 30, 2022 (EP) .................................... 22182095

(51) Int. Cl.
*H04R 25/00* (2006.01)

(52) U.S. Cl.
CPC ......... *H04R 25/453* (2013.01); *H04R 25/405* (2013.01); *H04R 2460/01* (2013.01)

(58) Field of Classification Search
CPC ................ H04R 25/453; H04R 25/407; H04R 2225/025; H04R 25/405; H04R 2460/01; H04R 3/005; H04R 2225/41; H04R 1/1083
USPC ........................ 381/318, 312, 317, 328, 94.1
See application file for complete search history.

(56) References Cited

U.S. PATENT DOCUMENTS

| | | | |
|---|---|---|---|
| 11,564,035 B1 * | 1/2023 | Ebenezer ......... | G10K 11/17881 |
| 2009/0041260 A1 | 2/2009 | Jorgensen et al. | |
| 2019/0394576 A1 * | 12/2019 | Petersen .............. | H04R 25/453 |
| 2020/0005759 A1 * | 1/2020 | Alderson ............... | H04R 1/406 |
| 2020/0382859 A1 * | 12/2020 | Woodruff ............. | H03G 3/3005 |
| 2021/0092531 A1 | 3/2021 | De Haan et al. | |

FOREIGN PATENT DOCUMENTS

| | | |
|---|---|---|
| DK | 2237573 | * 10/2010 |
| EP | 2237573 | 10/2010 |

* cited by examiner

*Primary Examiner* — Norman Yu

(57) ABSTRACT

A hearing aid comprises a forward path comprising a) an input transducer for converting sound (x(n), v(n)) in an environment around the hearing aid to an electric input signal (y(n)) representing said sound; b) a hearing aid processor for processing said electric input signal (y(n)), or a signal originating therefrom (e(n)), and to provide a processed signal (u(n)) based thereon; c) an output transducer for converting said processed signal (u(n)), or a signal originating therefrom ($u_a$(n)), to acoustic stimuli presented to said eardrum of the user. The hearing aid further comprises d) a feedback control system for attenuating or cancelling feedback propagated via a feedback path (H) from an electric input signal to said output transducer to an electric output from said input transducer.

13 Claims, 6 Drawing Sheets

HEARING AID COMPRISING A COMBINED FEEDBACK AND ACTIVE NOISE CANCELLATION SYSTEM

TECHNICAL FIELD

The present disclosure relates to hearing aids, in particular to a combination of feedback control and active noise reduction.

A modern hearing aid is equipped with a feedback cancellation system, while active noise cancellation is in the coming. The present application deals with a scheme for combining feedback control and active noise reduction to obtain the optimal performance in both systems.

SUMMARY

The present disclosure describes a number combinations of the two systems in a hearing aid.

A First Hearing Aid:

In a first aspect of the present application, a hearing aid configured to be worn at an ear, at least partially in an ear canal comprising an eardrum, of a user, is provided. The hearing aid comprises

- a forward path, the forward path comprising
  - an input transducer for converting sound (x(n), v(n)) in an environment around the hearing aid to an electric input signal (y(n)) representing said sound;
  - a hearing aid processor for processing said electric input signal (y(n)), or a signal originating therefrom (e(n)), and to provide a processed signal (u(n)) based thereon;
  - an output transducer for converting said processed signal (u(n)), or a signal originating therefrom ($u_a$(n)), to acoustic stimuli presented to said eardrum of the user;
- feedback control system for attenuating or cancelling feedback propagated via a feedback path (H) from an electric input signal to said output transducer to an electric output from said input transducer, the feedback control system comprising
  - a first adaptive filter configured to provide an estimate (v') of said feedback, the first adaptive filter comprising
    - a variable filter comprising configurable filter coefficients, for providing a current estimate (v'(n)) of said feedback in dependence of a current variable filter input signal; and
    - an adaptive algorithm for providing updated filter coefficients to said variable filter in dependence of first and second algorithm input signals; and
  - a first combination unit located in the forward path for combining said current estimate (v'(n)) of feedback with a signal of the forward path and providing a feedback-corrected input signal (e(n)); and wherein the first and second algorithm input signals are the feedback corrected input signal (e(n)) and the processed signal (u(n)), respectively;
- an active noise control system configured to attenuate or cancel sound directly propagated via a direct propagation path (P) from said environment to said eardrum of the user, the active noise control system comprising
  - a second filter (ANC filter) configured to provide a cancellation signal (a(n)) of said directly propagated sound in dependence of a current filter input signal, and

- a second combination unit located in the forward path for combining said cancellation signal (a(n)) of said directly propagated sound with said processed signal (u(n)), and providing a noise cancelled signal ($u_a$(n)).

The hearing aid may further be configured to provide a) that said current variable filter input signal is a signal comprising said processed signal (u(n)) compensated by the cancellation signal (a(n)) filtered by the feedback path (H) or its estimate (H'); and b) said current filter input signal is said electric input signal (y(n)), or a signal originating therefrom (e(n)).

Thereby an improved hearing aid may be provided.

A Second Hearing Aid:

In a second aspect a hearing aid configured to be worn at an ear, at least partially in an ear canal comprising an eardrum, of a user, is provided. The hearing aid comprises

- a forward path, the forward path comprising
  - an input transducer for converting sound (x(n), v(n)) in an environment around the hearing aid to an electric input signal (y(n)) representing said sound;
  - a hearing aid processor for processing said electric input signal (y(n)), or a signal originating therefrom (e(n)), and to provide a processed signal (u(n)) based thereon;
  - an output transducer for converting said processed signal (u(n)), or a signal originating therefrom ($u_a$(n)), to acoustic stimuli presented to said eardrum of the user;
- feedback control system for cancelling or attenuating feedback from said output transducer to said input transducer, the feedback control system comprising
  - a first adaptive filter, the first adaptive filter being configured to provide an estimate of feedback from a feedback path from an electric input signal to said output transducer to an electric output of said input transducer, the first adaptive filter comprising
    - a variable filter comprising configurable filter coefficients, for providing a current estimate (v'(n)) of feedback in dependence of a current variable filter input signal; and
    - an adaptive algorithm for providing updated filter coefficients to said variable filter in dependence of first and second algorithm input signals; and
  - a first combination unit located in the forward path for combining said current estimate of feedback (v'(n)) with a signal of the forward path, e.g. said electric input signal (y(n)), and providing a feedback corrected input signal (e(n)); and wherein the first and second algorithm input signals are the feedback corrected input signal (e(n)) and the processed signal (u(n)), respectively;
- an active noise control system configured to attenuate or cancel sound directly propagated via a direct propagation path (P) from said environment to said eardrum of the user, the active noise control system comprising
  - a second filter (ANC filter) configured to provide a cancellation signal (a(n)) of said directly propagated sound based on a current filter input signal, and
  - a second combination unit located in the forward path for combining said cancellation signal (a(n)) of said directly propagated sound with said processed signal (u(n)), and providing a noise cancelled signal ($u_a$(n));

wherein

- said current variable filter input signal is said noise cancelled signal ($u_a$(n)), or a signal originating therefrom; and said current filter input signal is said electric input signal (y(n)), or a signal originating therefrom (e(n)).

Thereby an improved hearing aid may be provided.

A Third Hearing Aid:

According to a further aspect of the present disclosure, a hearing aid is provided. The hearing aid comprises a forward path comprising an input transducer for converting sound (x(n), v(n)) in an environment around the hearing aid to an electric input signal (y(n)) representing said sound;

a hearing aid processor for processing said electric input signal (y(n)), or a signal originating therefrom, and to provide a processed signal (u(n)) based thereon; and an output transducer for converting said processed signal (u(n)), or a signal originating therefrom, to acoustic stimuli presented to said eardrum of the user, a feedback control system for attenuating or cancelling feedback propagated via a feedback path (H) from an electric input signal to said output transducer to an electric output from said input transducer, the feedback control system comprising an adaptive filter configured to provide an estimate (v'(n)) of said feedback, the first adaptive filter comprising a variable filter comprising configurable filter coefficients, for providing a current estimate (v'(n)) of said feedback in dependence of a current variable filter input signal; and an adaptive algorithm for providing updated filter coefficients to said variable filter in dependence of first and second algorithm input signals, termed error and reference signals, respectively;

a first combination unit located in the forward path for combining said current estimate (v'(n)) of feedback with a signal of the forward path and providing a feedback corrected input signal (e(n));

an active noise control system configured to attenuate or cancel sound directly propagated via a direct propagation path (P) from said environment to said eardrum of the user, the active noise control system comprising a filter (ANC filter) configured to provide a cancellation signal (a(n)) of said directly propagated sound in dependence of a current filter input signal, and a second combination unit located in the forward path for combining said cancellation signal (a(n)) of said directly propagated sound with said processed signal (u(n)), and providing a noise cancelled signal ($u_a$(n));

wherein said second algorithm input (reference) signal is said processed signal (u(n)), and said current variable filter input signal is said noise cancelled signal ($u_a$(n)).

Thereby an improved hearing aid may be provided.

Features of the First, Second and Third Hearing Aids:

In the present context, the term 'signal of the forward path' is taken to mean 'the electric input signal (of the input transducer), or a signal originating therefrom'.

The (noise cancelled) output signal is $u_a(n)=u(n)-a(n)$, where u(n) is the output signal of the hearing aid processor and a(n) is the cancellation signal provided by the ANC filter. The signal '−a(n)' filtered by the feedback transfer function (H) will thus form part of the feedback signal 'v(n)' and hence the electric input signal y(n). Ideally, we would hereby like to compensate it by adding a(n) filtered by the feedback transfer function H to the electric input signal y(n) This is then done by using the (noise cancelled) output signal $u_a$(n) as the input to the feedback cancellation filter H', so that we compensate y(n) with a(n) filtered by H'. In other words, the current variable filter input signal a the current (noise cancelled) output signal ($u_a$(n)). Thereby an improved hearing aid is provided.

The current variable filter input signal may be the noise cancelled signal, or a signal originating therefrom. The current filter input signal may be the feedback corrected input signal.

In the above definition of the (transfer function of the) feedback path (H), the transfer functions of the output transducer and the input transducer are included (and likewise in the transfer function (H') estimated by the variable filter part (denoted 'Time-Varying Filter H'(z)') of the adaptive filter.

A more sophisticated estimation may omit transducer transfer functions, as these are in principle stationary and known a priori, so those parts of the feedback path can be compensated without using an adaptive filter (leaving only the acoustic part to be estimated).

In reality, though, it may be difficult to compensate the transducer transfer functions fully, so it often the filter transfer function (H'(z)) has to, at least partly, compensate for these.

The signal of the forward path used as input to the first combination unit may e.g. be the electric input signal, or a signal originating therefrom (e.g. a spatially filtered, beamformed, signal).

The current filter input signal may be the electric input signal, or a signal originating therefrom.

The current filter input signal may be the feedback corrected input signal, or a signal originating therefrom.

The hearing aid may comprise a filter bank allowing processing in the hearing aid to be performed, at least partially, in a number of frequency sub-bands.

The hearing aid processor may be configured to process the electric input signal, or a signal originating therefrom, to compensate for a hearing impairment of the user.

The input transducer may comprise a multitude of input transducers providing a corresponding multitude of different electric input signals.

The hearing aid mat comprise a directional system connected to the multitude of input transducers and to the hearing aid processing unit. The directional system may provide one or more beamformed signals in dependence of the multitude of different electric input signals (and fixed or adaptively updated beamformer filter coefficients). The processed signal may be provided in dependence of the one or more beamformed signals.

The (second) filter (the ANC filter) may be a fixed filter having fixed, e.g. predetermined, filter coefficients. The fixed filter coefficients may be determined in advance of use of the hearing aid, e.g. in a sound laboratory, e.g. using a model of human head and torso, or a real person, e.g. the user, equipped with a hearing aid equivalent to the claimed hearing aid of the user.

The (second) filter (the ANC filter) may be estimated as P'(z)/S'(z), where the P'(z) is an estimate of the acoustic transfer function (P) of a primary path of the directly propagated sound from the input transducer to an active noise cancellation point at the ear drum, and S'(z) is an estimate of the acoustic transfer function (S) of a secondary path from the output transducer to the active noise cancellation point.

The (second) filter (the ANC filter) may comprise an adaptive filter having adaptively updated filter coefficients. The basic condition for updating the filter coefficients may include a) the hearing aid has to be worn by the user, b) an update trigger may be driven by the current acoustic situation or individualized according to the user (e.g. in connection with movement of the hearing aid on the user, e.g. in connection with power-on, where the hearing aid(s) is freshly mounted).

The hearing aid may be constituted by or comprise a hearing instrument, e.g. a hearing instrument adapted for being located at the ear or fully or partially in the ear canal of a user, e.g. a headset, an earphone, an ear protection device or a combination thereof.

The hearing aid may be adapted to provide a frequency dependent gain and/or a level dependent compression and/or a transposition (with or without frequency compression) of one or more frequency ranges to one or more other frequency ranges, e.g. to compensate for a hearing impairment of a user. The hearing aid may comprise a signal processor for enhancing the input signals and providing a processed output signal.

The hearing aid may comprise an output unit for providing a stimulus perceived by the user as an acoustic signal based on a processed electric signal. The output unit may comprise a number of electrodes of a cochlear implant (for a CI type hearing aid) or a vibrator of a bone conducting hearing aid. The output unit may comprise an output transducer. The output transducer may comprise a receiver (loudspeaker) for providing the stimulus as an acoustic signal to the user (e.g. in an acoustic (air conduction based) hearing aid). The output transducer may comprise a vibrator for providing the stimulus as mechanical vibration of a skull bone to the user (e.g. in a bone-attached or bone-anchored hearing aid). The output unit may (additionally or alternatively) comprise a transmitter for transmitting sound picked up-by the hearing aid to another device, e.g. a far-end communication partner (e.g. via a network, e.g. in a telephone mode of operation, or in a headset configuration).

The hearing aid may comprise an input unit for providing an electric input signal representing sound. The input unit may comprise an input transducer, e.g. a microphone, for converting an input sound to an electric input signal. The input unit may comprise a wireless receiver for receiving a wireless signal comprising or representing sound and for providing an electric input signal representing said sound.

The wireless receiver and/or transmitter may e.g. be configured to receive and/or transmit an electromagnetic signal in the radio frequency range (3 kHz to 300 GHz). The wireless receiver and/or transmitter may e.g. be configured to receive and/or transmit an electromagnetic signal in a frequency range of light (e.g. infrared light 300 GHz to 430 THz, or visible light, e.g. 430 THz to 770 THz).

The hearing aid may comprise a directional microphone system adapted to spatially filter sounds from the environment, and thereby enhance a target acoustic source among a multitude of acoustic sources in the local environment of the user wearing the hearing aid. The directional system may be adapted to detect (such as adaptively detect) from which direction a particular part of the microphone signal originates. This can be achieved in various different ways as e.g. described in the prior art. In hearing aids, a microphone array beamformer is often used for spatially attenuating background noise sources. The beamformer may comprise a linear constraint minimum variance (LCMV) beamformer. Many beamformer variants can be found in literature. The minimum variance distortionless response (MVDR) beamformer is widely used in microphone array signal processing. Ideally the MVDR beamformer keeps the signals from the target direction (also referred to as the look direction) unchanged, while attenuating sound signals from other directions maximally. The generalized sidelobe canceller (GSC) structure is an equivalent representation of the MVDR beamformer offering computational and numerical advantages over a direct implementation in its original form.

The hearing aid may comprise antenna and transceiver circuitry allowing a wireless link to an entertainment device (e.g. a TV-set), a communication device (e.g. a telephone), a wireless microphone, or another hearing aid, etc. The hearing aid may thus be configured to wirelessly receive a direct electric input signal from another device. Likewise, the hearing aid may be configured to wirelessly transmit a direct electric output signal to another device. The direct electric input or output signal may represent or comprise an audio signal and/or a control signal and/or an information signal.

In general, a wireless link established by antenna and transceiver circuitry of the hearing aid can be of any type. The wireless link may be a link based on near-field communication, e.g. an inductive link based on an inductive coupling between antenna coils of transmitter and receiver parts. The wireless link may be based on far-field, electromagnetic radiation. Preferably, frequencies used to establish a communication link between the hearing aid and the other device is below 70 GHz, e.g. located in a range from 50 MHz to 70 GHz, e.g. above 300 MHz, e.g. in an ISM range above 300 MHz, e.g. in the 900 MHz range or in the 2.4 GHz range or in the 5.8 GHz range or in the 60 GHz range (ISM=Industrial, Scientific and Medical, such standardized ranges being e.g. defined by the International Telecommunication Union, ITU). The wireless link may be based on a standardized or proprietary technology. The wireless link may be based on Bluetooth technology (e.g. Bluetooth Low-Energy technology), or Ultra WideBand (UWB) technology.

The hearing aid may be or form part of a portable (i.e. configured to be wearable) device, e.g. a device comprising a local energy source, e.g. a battery, e.g. a rechargeable battery. The hearing aid may e.g. be a low weight, easily wearable, device, e.g. having a total weight less than 100 g, such as less than 20 g.

The hearing aid may comprise a ‘forward’ (or ‘signal’) path for processing an audio signal between an input and an output of the hearing aid. A signal processor may be located in the forward path. The signal processor may be adapted to provide a frequency dependent gain according to a user’s particular needs (e.g. hearing impairment). The hearing aid may comprise an ‘analysis’ path comprising functional components for analyzing signals and/or controlling processing of the forward path. Some or all signal processing of the analysis path and/or the forward path may be conducted in the frequency domain, in which case the hearing aid comprises appropriate analysis and synthesis filter banks. Some or all signal processing of the analysis path and/or the forward path may be conducted in the time domain.

An analogue electric signal representing an acoustic signal may be converted to a digital audio signal in an analogue-to-digital (AD) conversion process, where the analogue signal is sampled with a predefined sampling frequency or rate $f_s$, $f_s$ being e.g. in the range from 8 kHz to 48 kHz (adapted to the particular needs of the application) to provide digital samples $x_n$ (or x[n]) at discrete points in time to (or n), each audio sample representing the value of the acoustic signal at to by a predefined number $N_b$ of bits, $N_b$ being e.g. in the range from 1 to 48 bits, e.g. 24 bits. Each audio sample is hence quantized using $N_b$ bits (resulting in $2^{Nb}$ different possible values of the audio sample). A digital sample x has a length in time of $1/f_s$, e.g. 50 μs, for $f_s$=20 kHz. A number of audio samples may be arranged in a time frame. A time frame may comprise 64 or 128 audio data samples. Other frame lengths may be used depending on the practical application.

The hearing aid may comprise an analogue-to-digital (AD) converter to digitize an analogue input (e.g. from an input transducer, such as a microphone) with a predefined sampling rate, e.g. 20 kHz. The hearing aids may comprise a digital-to-analogue (DA) converter to convert a digital signal to an analogue output signal, e.g. for being presented to a user via an output transducer.

The hearing aid, e.g. the input unit, and or the antenna and transceiver circuitry may comprise a transform unit for converting a time domain signal to a signal in the transform domain (e.g. frequency domain or Laplace domain, Z transform, wavelet transform, etc.). The transform unit may be constituted by or comprise a TF-conversion unit for providing a time-frequency representation of an input signal. The time-frequency representation may comprise an array or map of corresponding complex or real values of the signal in question in a particular time and frequency range. The TF conversion unit may comprise a filter bank for filtering a (time varying) input signal and providing a number of (time varying) output signals each comprising a distinct frequency range of the input signal. The TF conversion unit may comprise a Fourier transformation unit (e.g. a Discrete Fourier Transform (DFT) algorithm, or a Short Time Fourier Transform (STFT) algorithm, or similar) for converting a time variant input signal to a (time variant) signal in the (time-)frequency domain. The frequency range considered by the hearing aid from a minimum frequency $f_{min}$ to a maximum frequency $f_{max}$ may comprise a part of the typical human audible frequency range from 20 Hz to 20 kHz, e.g. a part of the range from 20 Hz to 12 kHz. Typically, a sample rate $f_s$ is larger than or equal to twice the maximum frequency $f_{max}$, $f_s \geq 2f_{max}$. A signal of the forward and/or analysis path of the hearing aid may be split into a number NI of frequency bands (e.g. of uniform width), where NI is e.g. larger than 5, such as larger than 10, such as larger than 50, such as larger than 100, such as larger than 500, at least some of which are processed individually. The hearing aid may be adapted to process a signal of the forward and/or analysis path in a number NP of different frequency channels (NP≤NI). The frequency channels may be uniform or non-uniform in width (e.g. increasing in width with frequency), overlapping or non-overlapping.

The hearing aid may be configured to operate in different modes, e.g. a normal mode and one or more specific modes, e.g. selectable by a user, or automatically selectable. A mode of operation may be optimized to a specific acoustic situation or environment, e.g. a communication mode, such as a telephone mode. A mode of operation may include a low-power mode, where functionality of the hearing aid is reduced (e.g. to save power), e.g. to disable wireless communication, and/or to disable specific features of the hearing aid.

The hearing aid may comprise a number of detectors configured to provide status signals relating to a current physical environment of the hearing aid (e.g. the current acoustic environment), and/or to a current state of the user wearing the hearing aid, and/or to a current state or mode of operation of the hearing aid. Alternatively or additionally, one or more detectors may form part of an external device in communication (e.g. wirelessly) with the hearing aid. An external device may e.g. comprise another hearing aid, a remote control, and audio delivery device, a telephone (e.g. a smartphone), an external sensor, etc.

One or more of the number of detectors may operate on the full band signal (time domain). One or more of the number of detectors may operate on band split signals ((time-) frequency domain), e.g. in a limited number of frequency bands.

The number of detectors may comprise a level detector for estimating a current level of a signal of the forward path. The detector may be configured to decide whether the current level of a signal of the forward path is above or below a given (L-)threshold value. The level detector operates on the full band signal (time domain). The level detector operates on band split signals ((time-) frequency domain).

The hearing aid may comprise a voice activity detector (VAD) for estimating whether or not (or with what probability) an input signal comprises a voice signal (at a given point in time). A voice signal may in the present context be taken to include a speech signal from a human being. It may also include other forms of utterances generated by the human speech system (e.g. singing). The voice activity detector unit may be adapted to classify a current acoustic environment of the user as a VOICE or NO-VOICE environment. This has the advantage that time segments of the electric microphone signal comprising human utterances (e.g. speech) in the user's environment can be identified, and thus separated from time segments only (or mainly) comprising other sound sources (e.g. artificially generated noise). The voice activity detector may be adapted to detect as a VOICE also the user's own voice. Alternatively, the voice activity detector may be adapted to exclude a user's own voice from the detection of a VOICE.

The hearing aid may comprise an own voice detector for estimating whether or not (or with what probability) a given input sound (e.g. a voice, e.g. speech) originates from the voice of the user of the system. A microphone system of the hearing aid may be adapted to be able to differentiate between a user's own voice and another person's voice and possibly from NON-voice sounds.

The number of detectors may comprise a movement detector, e.g. an acceleration sensor. The movement detector may be configured to detect movement of the user's facial muscles and/or bones, e.g. due to speech or chewing (e.g. jaw movement) and to provide a detector signal indicative thereof.

The hearing aid may comprise a classification unit configured to classify the current situation based on input signals from (at least some of) the detectors, and possibly other inputs as well. In the present context 'a current situation' may be taken to be defined by one or more of a) the physical environment (e.g. including the current electromagnetic environment, e.g. the occurrence of electromagnetic signals (e.g. comprising audio and/or control signals) intended or not intended for reception by the hearing aid, or other properties of the current environment than acoustic);
b) the current acoustic situation (input level, feedback, etc.), and
c) the current mode or state of the user (movement, temperature, cognitive load, etc.);
d) the current mode or state of the hearing aid (program selected, time elapsed since last user interaction, etc.) and/or of another device in communication with the hearing aid.

The classification unit may be based on or comprise a neural network, e.g. a trained neural network.

The hearing aid comprises an acoustic (and/or mechanical) feedback control (e.g. suppression) or echo-cancelling system. Adaptive feedback cancellation has the ability to track feedback path changes over time. It is typically based on a linear time invariant filter to estimate the feedback path but its filter weights are updated over time. The filter update may be calculated using stochastic gradient algorithms, including some form of the Least Mean Square (LMS) or the Normalized LMS (NLMS) algorithms. They both have the property to minimize the error signal in the mean square sense with the NLMS additionally normalizing the filter update with respect to the squared Euclidean norm of some reference signal.

The hearing aid may further comprise other relevant functionality for the application in question, e.g. compression, noise reduction, etc.

The hearing aid may comprise a hearing instrument, e.g. a hearing instrument adapted for being located at the ear or fully or partially in the ear canal of a user, e.g. a headset, an earphone, an ear protection device or a combination thereof. A hearing system may comprise a speakerphone (comprising a number of input transducers and a number of output transducers, e.g. for use in an audio conference situation), e.g. comprising a beamformer filtering unit, e.g. providing multiple beamforming capabilities.

Use:

In an aspect, use of a hearing aid as described above, in the ‘detailed description of embodiments’ and in the claims, is moreover provided. Use may be provided in a system comprising one or more hearing aids (e.g. hearing instruments), headsets, ear phones, active ear protection systems, etc., e.g. in handsfree telephone systems, teleconferencing systems (e.g. including a speakerphone), public address systems, karaoke systems, classroom amplification systems, etc.

A Method:

In an aspect, a method of operating a hearing aid configured to be worn at an ear, at least partially in an ear canal comprising an eardrum, of a user, is provided. The hearing aid comprises

- a forward path, the forward path comprising
  - an input transducer for converting sound (x(n), v(n)) in an environment around the hearing aid to an electric input signal (y(n)) representing said sound;
  - a hearing aid processor for processing said electric input signal (y(n)), or a signal originating therefrom (e(n)), and to provide a processed signal (u(n)) based thereon;
  - an output transducer for converting said processed signal (u(n)), or a signal originating therefrom ($u_a$(n)), to acoustic stimuli presented to said eardrum of the user.

The method comprises (steps of)

- attenuating or cancelling feedback (v) propagated via a feedback path (H) from an electric input signal to said output transducer to an electric output from said input transducer, by adaptive filtering comprising
  - providing an estimate (v') of said feedback by a variable filter comprising configurable filter coefficients, for providing a current estimate (v'(n)) of said feedback in dependence of a current variable filter input signal; and
  - adaptively providing updated filter coefficients to said variable filter in dependence of first and second algorithm input signals; and
  - combining in said forward path said current estimate (v'(n)) of feedback with a signal of the forward path and providing a feedback-corrected input signal (e(n)); and
- wherein the first and second algorithm input signals are the feedback corrected input signal (e(n)) and the processed signal (u(n)), respectively;
- attenuating or cancelling sound directly propagated via a direct propagation path (P) from said environment to said eardrum of the user, by
  - filtering to provide a cancellation signal (a(n)) of said directly propagated sound in dependence of a current filter input signal, and
  - combining in said forward path said cancellation signal (a(n)) of said directly propagated sound with said processed signal (u(n)), and providing a noise cancelled signal ($u_a$(n)).

The method may further comprise that said current variable filter input signal is a signal comprising said processed signal (u(n)) compensated by the cancellation signal a(n) filtered by the feedback path (H) or its estimate (H'); and that said current filter input signal is said electric input signal (y(n)), or a signal originating therefrom (e(n)).

It is intended that some or all of the structural features of the device described above, in the ‘detailed description of embodiments’ or in the claims can be combined with embodiments of the method, when appropriately substituted by a corresponding process and vice versa. Embodiments of the method have the same advantages as the corresponding devices.

The method may comprise

- providing that said current variable filter input signal is said noise cancelled signal ($u_a$(n)), or a signal originating therefrom.

The method may comprise

- providing that the current (‘second’) filter input signal is the feedback corrected input signal (e(n)).

A Computer Readable Medium or Data Carrier:

In an aspect, a tangible computer-readable medium (a data carrier) storing a computer program comprising program code means (instructions) for causing a data processing system (a computer) to perform (carry out) at least some (such as a majority or all) of the (steps of the) method described above, in the ‘detailed description of embodiments’ and in the claims, when said computer program is executed on the data processing system is furthermore provided by the present application.

By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Other storage media include storage in DNA (e.g. in synthesized DNA strands). Combinations of the above should also be included within the scope of computer-readable media. In addition to being stored on a tangible medium, the computer program can also be transmitted via a transmission medium such as a wired or wireless link or a network, e.g. the Internet, and loaded into a data processing system for being executed at a location different from that of the tangible medium.

A Computer Program:

A computer program (product) comprising instructions which, when the program is executed by a computer, cause the computer to carry out (the steps of) the method described above, in the 'detailed description of embodiments' and in the claims is furthermore provided by the present application.

A Data Processing System:

In an aspect, a data processing system comprising a processor and program code means for causing the processor to perform at least some (such as a majority or all) of the steps of the method described above, in the 'detailed description of embodiments' and in the claims is furthermore provided by the present application.

A Hearing System:

In a further aspect, a hearing system comprising a hearing aid as described above, in the 'detailed description of embodiments', and in the claims, AND an auxiliary device is moreover provided.

The hearing system may be adapted to establish a communication link between the hearing aid and the auxiliary device to provide that information (e.g. control and status signals, possibly audio signals) can be exchanged or forwarded from one to the other.

The auxiliary device may comprise a remote control, a smartphone, or other portable or wearable electronic device, such as a smartwatch or the like.

The auxiliary device may be constituted by or comprise a remote control for controlling functionality and operation of the hearing aid(s). The function of a remote control may be implemented in a smartphone, the smartphone possibly running an APP allowing to control the functionality of the audio processing device via the smartphone (the hearing aid(s) comprising an appropriate wireless interface to the smartphone, e.g. based on Bluetooth or some other standardized or proprietary scheme).

The auxiliary device may be constituted by or comprise an audio gateway device adapted for receiving a multitude of audio signals (e.g. from an entertainment device, e.g. a TV or a music player, a telephone apparatus, e.g. a mobile telephone or a computer, e.g. a PC) and adapted for selecting and/or combining an appropriate one of the received audio signals (or combination of signals) for transmission to the hearing aid.

The auxiliary device may be constituted by or comprise another hearing aid. The hearing system may comprise two hearing aids adapted to implement a binaural hearing system, e.g. a binaural hearing aid system.

An APP:

In a further aspect, a non-transitory application, termed an APP, is furthermore provided by the present disclosure. The APP comprises executable instructions configured to be executed on an auxiliary device to implement a user interface for a hearing aid or a hearing system described above in the 'detailed description of embodiments', and in the claims. The APP may be configured to run on cellular phone, e.g. a smartphone, or on another portable device allowing communication with said hearing aid or said hearing system.

Embodiments of the disclosure may e.g. be useful in applications such as hearing aids or headsets, e.g. earphones.

BRIEF DESCRIPTION OF DRAWINGS

The aspects of the disclosure may be best understood from the following detailed description taken in conjunction with the accompanying figures. The figures are schematic and simplified for clarity, and they just show details to improve the understanding of the claims, while other details are left out. Throughout, the same reference numerals are used for identical or corresponding parts. The individual features of each aspect may each be combined with any or all features of the other aspects. These and other aspects, features and/or technical effect will be apparent from and elucidated with reference to the illustrations described hereinafter in which:

The figures are schematic and simplified for clarity, and they just show details which are essential to the understanding of the disclosure, while other details are left out. Throughout, the same reference signs are used for identical or corresponding parts.

Further scope of applicability of the present disclosure will become apparent from the detailed description given hereinafter. However, it should be understood that the detailed description and specific examples, while indicating preferred embodiments of the disclosure, are given by way of illustration only. Other embodiments may become apparent to those skilled in the art from the following detailed description.

DETAILED DESCRIPTION OF EMBODIMENTS

The detailed description set forth below in connection with the appended drawings is intended as a description of various configurations. The detailed description includes specific details for the purpose of providing a thorough understanding of various concepts. However, it will be apparent to those skilled in the art that these concepts may be practiced without these specific details. Several aspects of the apparatus and methods are described by various blocks, functional units, modules, components, circuits, steps, processes, algorithms, etc. (collectively referred to as "elements"). Depending upon particular application, design constraints or other reasons, these elements may be implemented using electronic hardware, computer program, or any combination thereof.

The electronic hardware may include micro-electronic-mechanical systems (MEMS), integrated circuits (e.g. application specific), microprocessors, microcontrollers, digital signal processors (DSPs), field programmable gate arrays (FPGAs), programmable logic devices (PLDs), gated logic, discrete hardware circuits, printed circuit boards (PCB) (e.g. flexible PCBs), and other suitable hardware configured to perform the various functionality described throughout this disclosure, e.g. sensors, e.g. for sensing and/or registering physical properties of the environment, the device, the user, etc. Computer program shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The present disclosure relates to hearing aids or headsets or earphones, in particular to a combination of feedback control and active noise reduction.

A modern hearing aid is equipped with a feedback cancellation system, while active noise cancellation is in the coming. The present application deals with a scheme for combining feedback control and active noise reduction to obtain the optimal performance in both systems.

Figure 1:
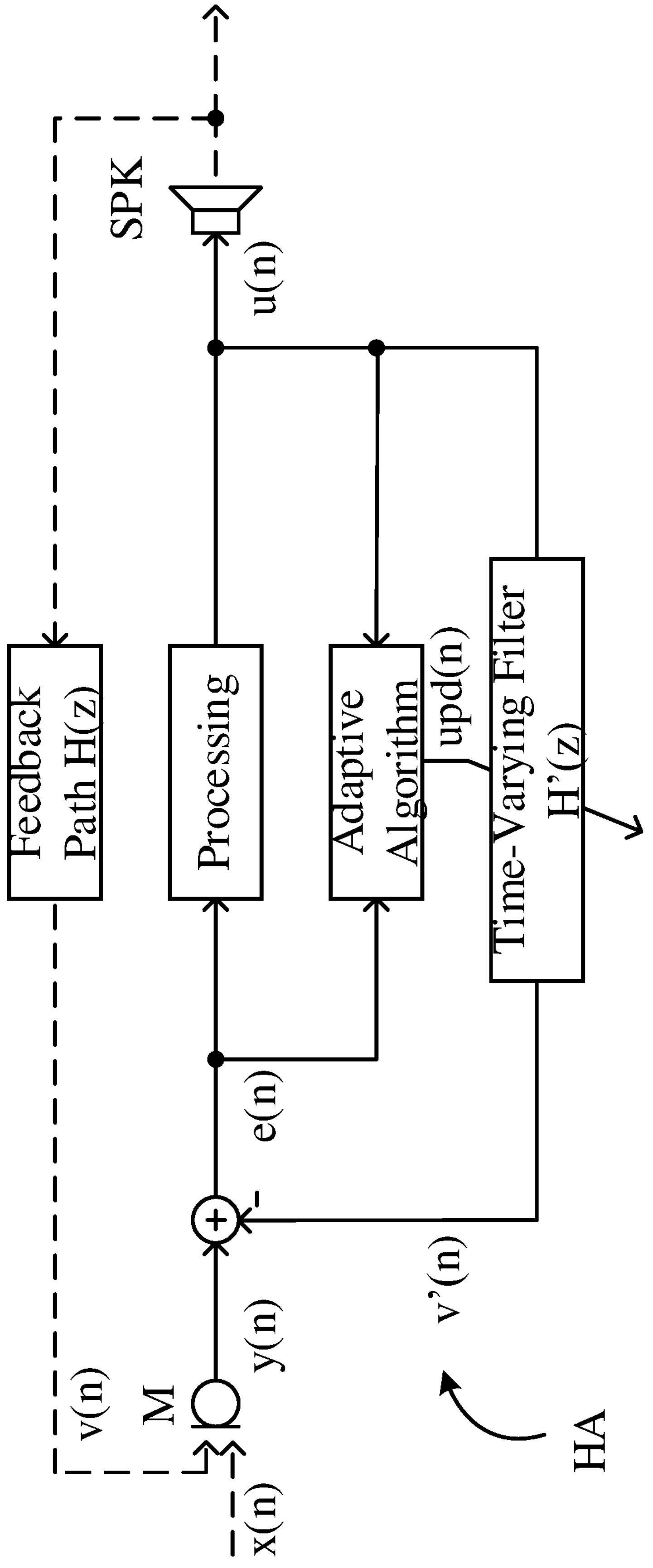
FIG. 1 shows a feedback cancellation system for a hearing aid wherein the estimation of the adaptive filter $\hat{h}(n)$ is based on the signals u(n) and e(n)

FIG. 1 shows a feedback cancellation system for a hearing aid wherein the estimation of the adaptive filter $\hat{h}(n)$ is based on the signals u(n) and e(n). The feedback cancellation system has the goal to compensate for (diminish or cancel) the acoustic 'Feedback Path H(z)' modelled by the transfer function H'(z) of the 'Time-Varying Filter H'(z)'. The hearing aid (HA) is configured to be worn at an ear, at least partially in an ear canal, of a user.

The forward path of the hearing aid (HA) comprises an input transducer (here a microphone (M)) for picking up sound from the environment of the hearing aid and providing an electric input signal (y(n)) representing the sound. The input transducer may comprise an analogue to digital converter (AD-converter) for converting an analogue output of the microphone to a digital signal (or the output of the microphone unit may be inherently digital, e.g. as in the case of a MEMS-microphone). The forward path further comprises a signal processor ('Processing') for applying one or more processing algorithms to a signal (here e(n) of the forward path (e.g. to adapt the signal to the needs, e.g. a hearing impairment, of a wearer of the hearing aid) and to provide a processed signal (u(n) in dependence thereof. The forward path of the hearing aid (HA) further comprises an output transducer (here a loudspeaker (SPK)) for generating an acoustic output to the wearer of the hearing aid. The forward path may (if technically relevant) further comprise a digital to analogue converter (DA-converter) connected to the output transducer and configured to convert the digital output signal (here the processed signal u(n)) to an analogue signal as input to the output transducer.

An (external, unintentional) (acoustical/mechanical) 'Feedback path H(z)' from the output transducer (SPK) to the input transducer (M) is indicated. The electrical feedback cancellation path comprises an adaptive filter ('Adaptive Algorithm', 'Time-Varying Filter H'(z)'), whose filtering function ('Time-Varying Filter H'(z)) is controlled by a prediction error algorithm ('Adaptive Algorithm'), e.g. an LMS (Least Means Squared) algorithm, in order to predict and preferably cancel the part of the microphone signal (y(n)) that is caused by feedback (v(n)) from the output transducer (SPK) of the hearing aid (HA) (as indicated in FIG. 1 by dashed arrow denoted 'Feedback path H(z)'). The adaptive filter is aimed at providing a good estimate v'(n) of the external feedback path (v(n) from the (input of the) output transducer (SPK) to the (output of the) input transducer (M). The prediction error algorithm uses a reference signal (here the output signal (u(n)) from the signal processor ('Processing') together with the (feedback corrected) input signal (e(n)) from the microphone (the error signal) to determine the current setting of the adaptive filter (specifically of the 'Time-Varying Filter H'(z)'), cf. filter update signal (upd(n)), that minimizes the prediction error (e(n)) when the reference signal (u(n)) is applied to the adaptive filter. The acoustic feedback is cancelled (or at least reduced by subtracting (cf. SUM-unit '+' in FIG. 1) the estimate (v'(n)) of the acoustic feedback path (v(n)) provided by the output of the filter part ('Time-Varying Filter H'(z)') of the adaptive filter from the electric input signal (y(n) from the microphone (M) comprising acoustic feedback (v(n)) to provide the feedback corrected input signal (error signal e(n) in FIG. 1).

Figure 2:
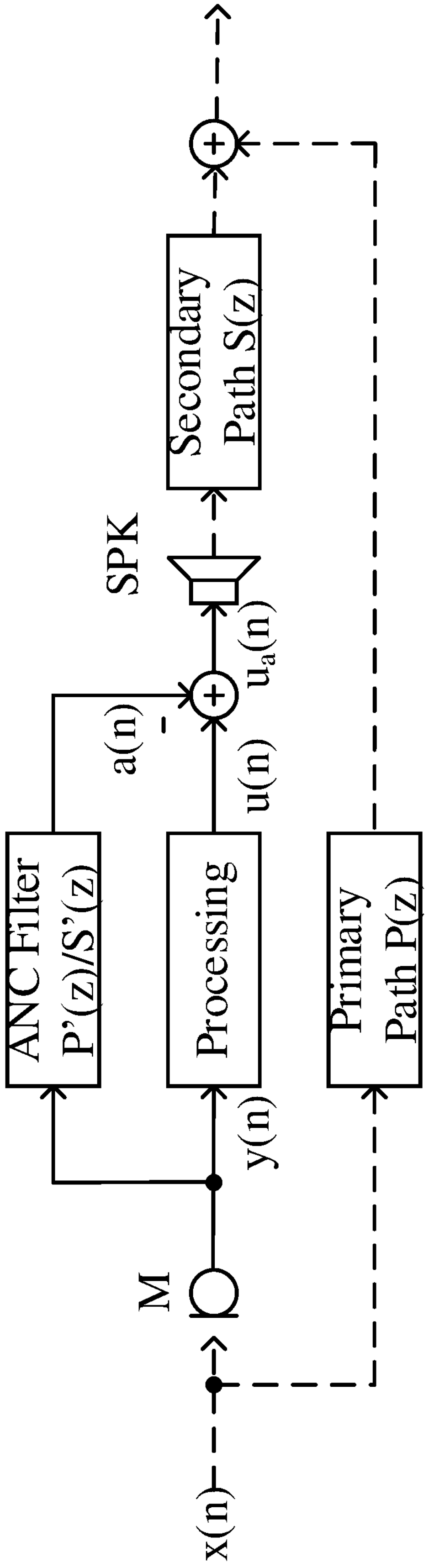
FIG. 2 shows an active noise cancellation system (feed-forward system) for a hearing aid.

FIG. 2 shows an active noise cancellation system (feed-forward system) for a hearing aid. The forward path of the hearing aid of FIG. 2 comprises the same main functional blocks as described in connection with FIG. 1, including the input transducer (M), the processor ('Processing') and the output transducer (SPK). The primary path transfer function P(z) (cf. block 'Primary Path P(z)') describes the acoustic transfer function from the hearing aid microphone (M) to the active noise cancellation point (ideally at the ear drum, and in practice it is typically somewhere different than but close to the ear drum), whereas the secondary path transfer function S(z) (cf. block 'Secondary Path S(z)') describes the acoustic transfer function from the hearing aid loudspeaker to the same active noise cancellation point. The primary and secondary paths represent (direct) propagation paths of sound from the environment to the eardrum (e.g. through a ventilation channel, or other opening in or around a part of the hearing aid, e.g. an earpiece) located in or at an ear canal of the user). The active noise cancellation system in the hearing aid processes the hearing aid input signal (y(n)) by the acoustic transfer function P'(z)/S'(z) (cf. block 'ANC Filter P'(z)/S'(z)', where P'(z) and S'(z) are estimates of the acoustic transfer functions (P(z) and S(z) and '/' indicates division) of the primary and secondary paths, respectively. The active noise signal (a(n)) provided by the ANC-filter ('ANC Filter P'(z)/S'(z)') is then subtracted from the hearing aid processed signal (u(n)) from the hearing aid processor ('Processing') to form the (noise cancelled) output signal ($u_a$(n)) to the output transducer (SPK), to obtain an active noise cancelling effect.

In all figures, the ANC filter is shown as a fixed filter (e.g. implemented as P'(z)/S'(z)). However, in practice, the ANC filter can also be time-varying (adaptively updated) and possibly personalized (comprising filter coefficients determined while the user is wearing the hearing aid).

Figure 3:
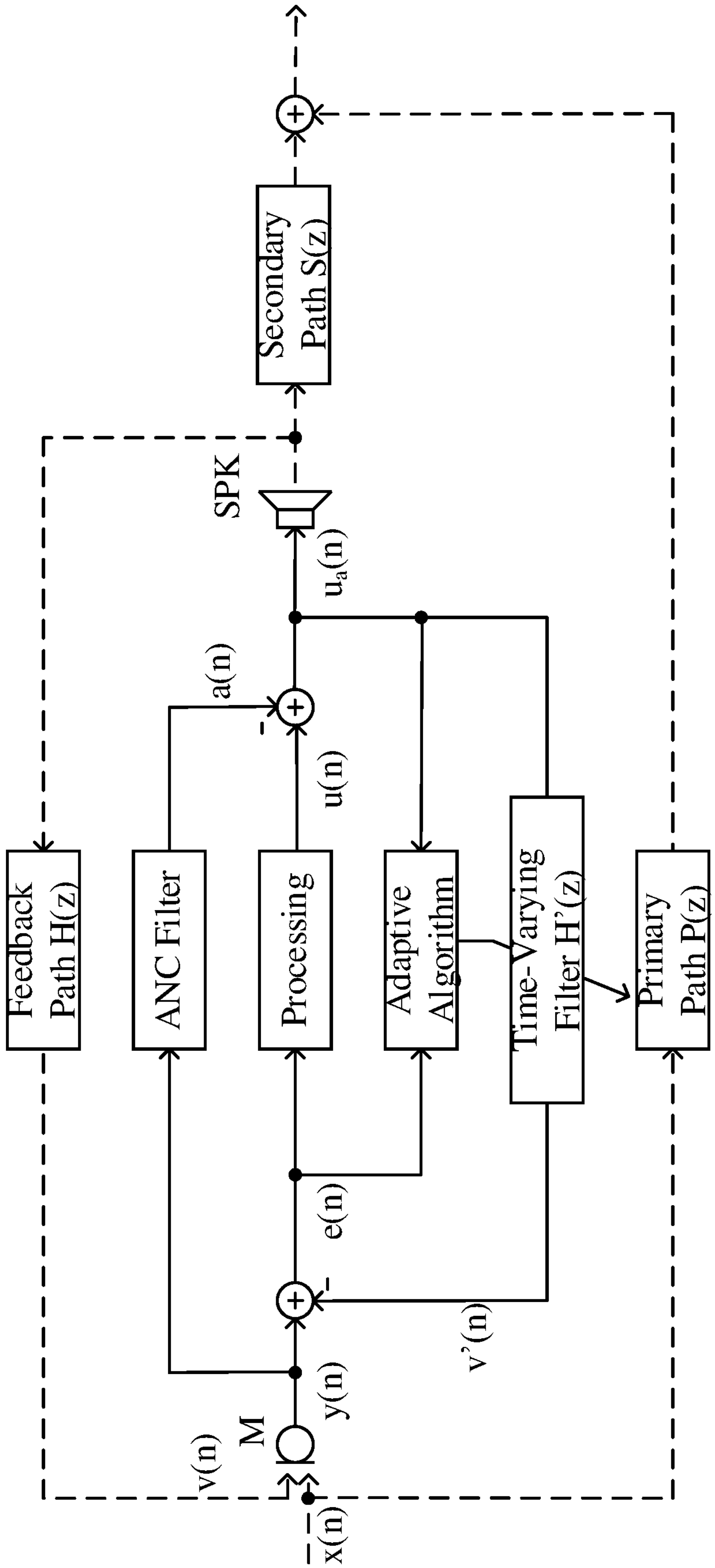
FIG. 3 shows a first embodiment of a combined feedback and active noise cancellation system for a hearing aid implemented as a direct combination of the feedback cancellation system of FIG. 1 with the active noise cancellation system of FIG. 2.

FIG. 3 shows a first embodiment of a combined feedback and active noise cancellation system for a hearing aid implemented as a direct combination of the feedback cancellation system of FIG. 1 with the active noise cancellation system of FIG. 2. The hearing aid of FIG. 3 thus comprises the same functional blocks that are shown in and described in connection with FIGS. 1 and 2 (in combination).

This first combined system is not (theoretically) optimal, though, as the active noise signal a(n) would increase the correlation between the incoming (acoustic) signal x(n) and the loudspeaker signal u(n), and this can be shown to worsen the so-called biased estimation problem for the adaptive filter H'(z).

The biased estimation problem in a stand-alone feedback cancellation system (FIG. 1) can be described, in terms of the estimated adaptive filter coefficients h'(n), as $$E[h'(n)]=h(n)+E[u(n)u^T(n)]^{-1}E[u(n)x(n)],$$

where h(n) is the impulse response of the feedback path transfer function H(z), u(n)=[u(n), u(n−1), . . . , u(n−L+1)]$^T$ is the vector consisting of L samples of the reference signal u(n), and L is the length of the impulse response h(n).

The expectation values of the adaptive filter coefficients E[h'(n)] consisting of two terms, the true feedback path h(n) and the product of the inverse correlation matrix $E[u(n)u^T(n)]^{-1}$ and the cross-correlation vector E[u(n)x(n)] between the loudspeaker signal u(n) and the incoming signal x(n).

For signals x(n) with auto-correlation functions to be zero at non-zero lags, e.g., a stochastic white noise sequence or a deterministic perfect sequence, the term E[u(n)x(n)] is simply a null-vector and does not affect the estimation of the adaptive filter H'(z). However, for most practical signals, the term E[u(n)x(n)] is non-zero, hence a bias occurs to the estimation of h'(n). There are also methods to de-correlate the signal u(n) from x(n), in the hearing aid processing, to reduce the effect of the biased estimation problem.

For the combined system shown in FIG. 3, the active noise cancellation system creates the active noise cancellation signal a(n), e.g. by using the transfer function of the ANC-filter (e.g. P'(z)/S'(z)) to modify the microphone signal y(n) and subtract the resulting signal (a(n)) from the processed signal u(n). This introduces an additional bias contribution to the adaptive filter coefficients h'(n), as the output signal $u_a(n)$ and the error signal e(n) are now used to update the adaptive filter h'(n). Now, even for signals x(n) with auto-correlation functions to be zero at non-zero lags, the correlation between x(n) and $u_a(n)$ will be non-zero due to the transfer function of the ANC filter (e.g. P'(z)/S'(z)).

In practice, this additional bias contribution can be limited, though (and maybe even neglectable in some situations).

Figure 4:
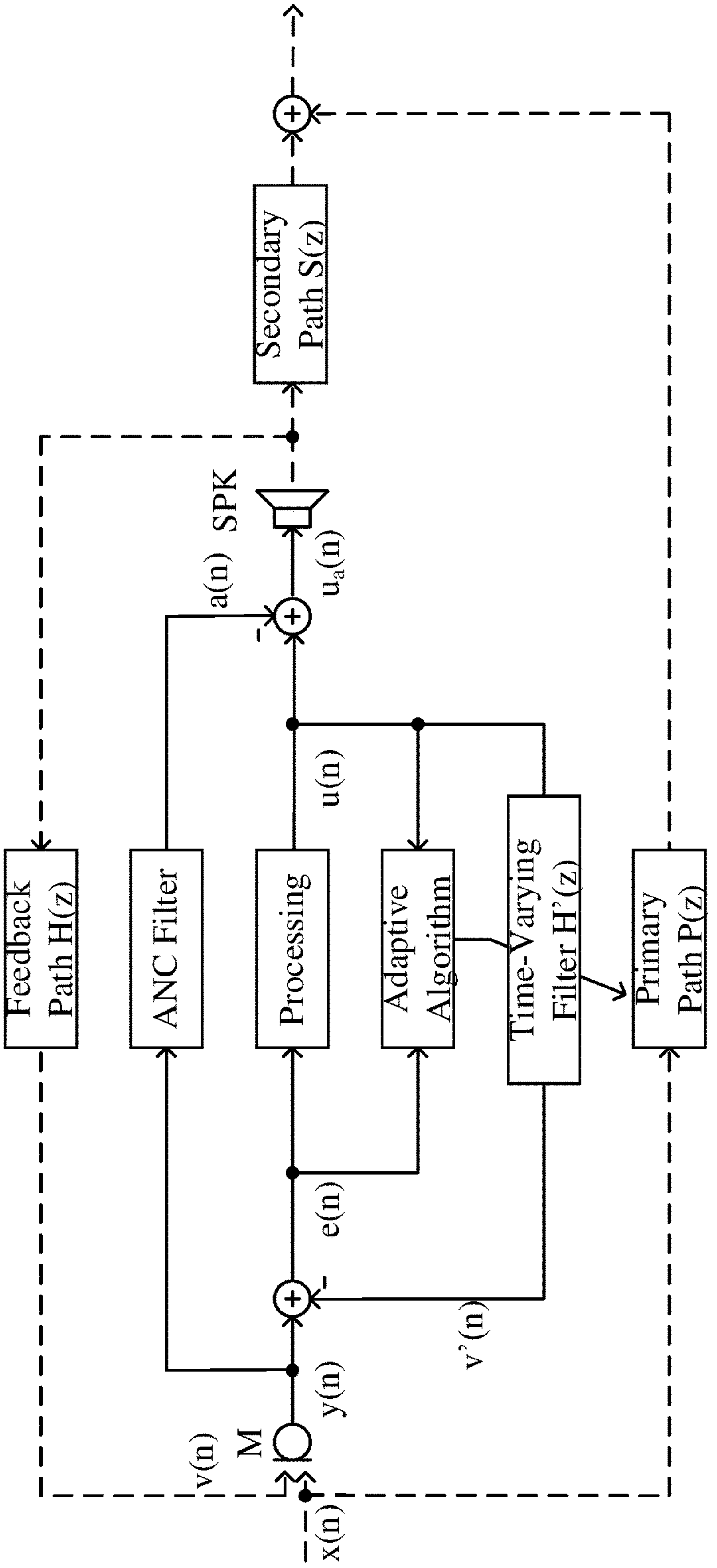
FIG. 4 shows a second embodiment of a combined feedback and active noise cancellation system for a hearing aid according to the present disclosure.

FIG. 4 shows a second embodiment of a combined feedback and active noise cancellation system for a hearing aid according to the present disclosure.

This second system is similar to the system of FIG. 3 (in that it contains the same functional blocks), but in contrast to the system shown in FIG. 3, does not suffer from a more severe biased estimation problem compared to the traditional stand-alone feedback cancellation system (FIG. 1), as the adaptive filter estimation again relies on the hearing processed signal u(n) and the error signal e(n). However, it is not optimal either.

The active noise cancellation signal a(n) is no longer directly used for the estimation of the adaptive filter H'(z), but it is part of the loudspeaker signal $u_a(n)$. The signal a(n) is a processed version of x(n) by the transfer function of the ANC filer (e.g. P'(z)/S'(z)), and it goes further through the feedback path transfer function H(z) before returning to the microphone.

Hence, the additional disturbance signal is the incoming signal x(n) processed by P'(z)H(z)/S'(z). This can potentially lead to larger steady-state errors for the adaptive filter H(z).

Ideally, to compensate for this additional disturbance signal, we would like to add a compensation signal as the incoming signal x(n) processed by P'(z)H(z)/S'(z). This is though not possible in practice, as H(z) is unknown. However, an "elegant" compensation can be made as shown in FIG. 5.

Figure 5:
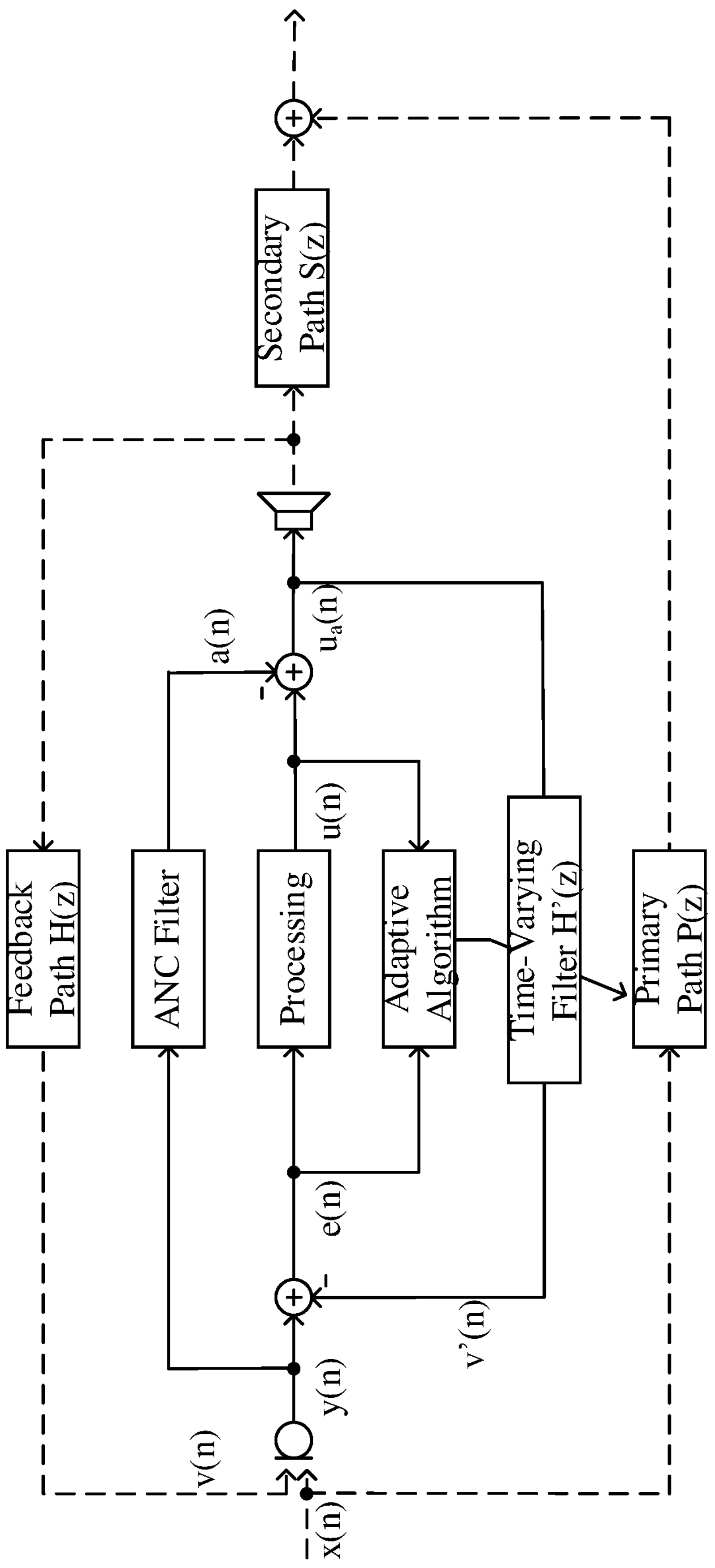
FIG. 5 shows a third embodiment of a combined feedback and active noise cancellation system for a hearing aid according to the present disclosure.

FIG. 5 shows a third embodiment of a combined feedback and active noise cancellation system for a hearing aid according to the present disclosure. The third system is similar to the system of FIG. 4 (in that it contains the same functional blocks).

This third system, similarly to the second system (FIG. 4), does not suffer from a more severe biased estimation problem compared to the traditional stand-alone feedback cancellation system (FIG. 1).

Furthermore, a compensation signal as the incoming signal x(n) processed by P'(z)H'(z)/S'(z) is introduced, and it can be simply implemented as the active noise cancellation signal a(n) processed by H'(z).

In FIG. 5, this is elegantly achieved by using the hearing aid processed signal u(n) for the adaptive filter estimation, and the hearing aid (noise cancelled) output signal $u_a(n)$ for the filtering to create the feedback cancellation signal v'(n).

Hence, in the steady-state of the adaptive filter, i.e., H'(z)~=H(z), the signal a(n) becomes (almost) transparent for the estimation of H'(z).

Figure 6:
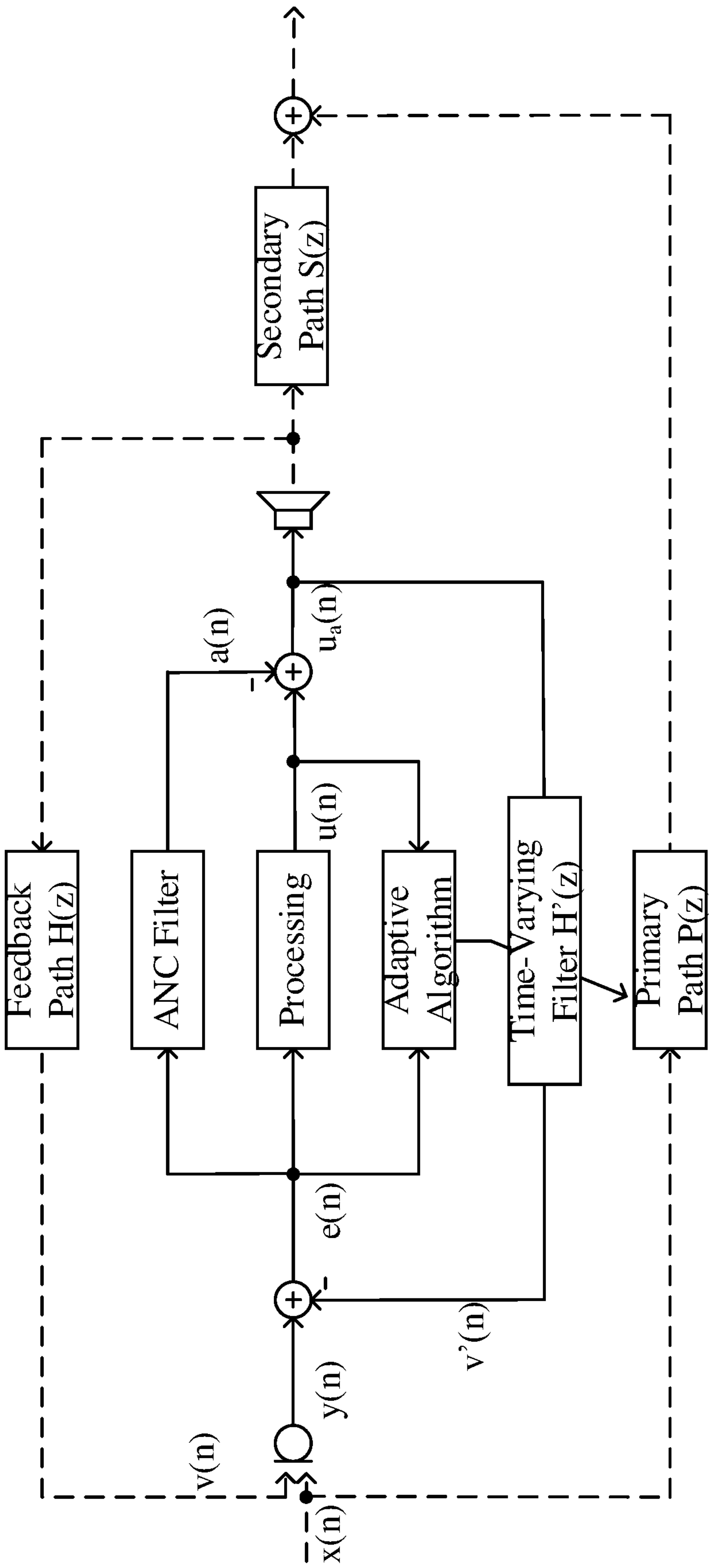
FIG. 6 shows a fourth embodiment of a combined feedback and active noise cancellation system for a hearing aid according to the present disclosure.

FIG. 6 shows a fourth embodiment of a combined feedback and active noise cancellation system for a hearing aid according to the present disclosure.

This fourth combined system creates the active noise cancellation signal a(n) from the error signal e(n) instead of from the microphone signal y(n) in the third combined system (see FIG. 5). An advantage of this system is that when the active noise cancellation signal a(n) is cleaned for the feedback signal v(n) by subtracting v(n) from y(n), hence ideally e(n)=x(n), which in feedback critical situations may provide a better active noise signal a(n).

It is intended that the structural features of the devices described above, either in the detailed description and/or in the claims, may be combined with steps of the method, when appropriately substituted by a corresponding process.

As used, the singular forms "a," "an," and "the" are intended to include the plural forms as well (i.e. to have the meaning "at least one"), unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will also be understood that when an element is referred to as being "connected" or "coupled" to another element, it can be directly connected or coupled to the other element, but an intervening element may also be present, unless expressly stated otherwise. Furthermore, "connected" or "coupled" as used herein may include wirelessly connected or coupled. As used herein, the term "and/or" includes any and all combinations of one or more of the associated listed items. The steps of any disclosed method are not limited to the exact order stated herein, unless expressly stated otherwise.

It should be appreciated that reference throughout this specification to "one embodiment" or "an embodiment" or "an aspect" or features included as "may" means that a particular feature, structure or characteristic described in connection with the embodiment is included in at least one embodiment of the disclosure. Furthermore, the particular features, structures or characteristics may be combined as suitable in one or more embodiments of the disclosure. The previous description is provided to enable any person skilled in the art to practice the various aspects described herein. Various modifications to these aspects will be readily apparent to those skilled in the art, and the generic principles defined herein may be applied to other aspects.

The claims are not intended to be limited to the aspects shown herein but are to be accorded the full scope consistent with the language of the claims, wherein reference to an element in the singular is not intended to mean "one and only one" unless specifically so stated, but rather "one or more." Unless specifically stated otherwise, the term "some" refers to one or more.

The invention claimed is:

1. A hearing aid configured to be worn at an ear, at least partially in an ear canal comprising an eardrum, of a user, the hearing aid comprising:

a forward path, the forward path comprising:

an input transducer configured to convert sound in an environment around the hearing aid to an electric input signal representing said sound;

a hearing aid processor configured to process a signal originating from said electric input signal, and to provide a processed signal based thereon, wherein the signal originating from said electric input signal is a feedback corrected input signal; and an output transducer configured to convert a signal originating from said processed signal, to acoustic stimuli presented to said eardrum of the user, wherein the signal originating from said processed signal is a noise cancelled signal;

a feedback control system configured to attenuate or cancel feedback propagated via a feedback path from said output transducer to said input transducer, the feedback control system comprising:

a first adaptive filter configured to provide an estimate of said feedback, the first adaptive filter comprising a variable filter comprising configurable filter coefficients, for providing a current estimate of said feedback in dependence of a current variable filter input signal; and an adaptive algorithm configured to provide updated filter coefficients to said variable filter in dependence of first and second algorithm input signals; and a first combination unit located in the forward path configured to combine said current estimate of feedback with the electric input signal and provide the feedback corrected input signal, wherein the signal of the forward path is the electric input signal; and wherein the first and second algorithm input signals are the feedback corrected input signal and the processed signal, respectively;

an active noise control system configured to attenuate or cancel sound directly propagated via a direct propagation path from said environment to said eardrum of the user, the active noise control system comprising:

a second filter configured to provide a cancellation signal of said directly propagated sound in dependence of a current filter input signal, and a second combination unit located in the forward path and configured to combine said cancellation signal of said directly propagated sound with said processed signal, and provide a said noise cancelled signal;

wherein:

said current variable filter input signal is said noise cancelled signal; and said current filter input signal is said feedback corrected input signal.

2. A hearing aid according to claim 1 wherein said current variable filter input signal is a signal comprising said processed signal compensated by the cancellation signal filtered by the feedback path or its estimate.

3. A hearing aid according to claim 1 comprising a filter bank allowing processing in the hearing aid to be performed, at least partially, in a number of frequency sub-bands.

4. A hearing aid according to claim 1 wherein said hearing aid processor is configured to process the signal originating from said electric input signal, to compensate for a hearing impairment of the user.

5. A hearing aid according to claim 1 wherein said input transducer comprises a multitude of input transducers providing a corresponding multitude of different electric input signals.

6. A hearing aid according to claim 5 comprising a directional system connected to said multitude of input transducers and to said hearing aid processing unit, the directional system providing one or more beamformed signals in dependence of said multitude of different electric input signals, and wherein said processed signal is provided in dependence of said one or more beamformed signals.

7. A hearing aid according to claim 1 wherein said second filter is a fixed filter having fixed filter coefficients.

8. A hearing aid according to claim 7 wherein said second filter is estimated as $P'(z)/S'(z)$, where the $P'(z)$ is an estimate of the acoustic transfer function of a primary path of the directly propagated sound from the input transducer to an active noise cancellation point at the ear drum, and $S'(z)$ is an estimate of the acoustic transfer function of a secondary path from the output transducer to the active noise cancellation point.

9. A hearing aid according to claim 1 wherein said second filter comprises an adaptive filter having adaptively updated filter coefficients.

10. A hearing aid according to claim 1 being constituted by or comprising a hearing instrument adapted for being located at the ear, at least partially in the ear canal, of a user, a headset, an earphone, an ear protection device or a combination thereof.

11. A method of operating a hearing aid configured to be worn at an ear, at least partially in an ear canal comprising an eardrum, of a user, the method comprising:

converting, by an input transducer of a forward path of the hearing aid, sound in an environment around the hearing aid to an electric input signal representing said sound;

processing, by a processor of the forward path of the hearing aid, a signal originating from said electric input signal, and providing, by the processor, a processed signal based thereon, wherein the signal originating from said electric input signal is a feedback corrected input signal; and converting, by an output transducer of the forward path of the hearing aid, a signal originating from said processed signal, to acoustic stimuli presented to said eardrum of the user, wherein the signal originating from said processed signal is a noise cancelled signal;

attenuating or cancelling feedback propagated via a feedback path from said output transducer to said input transducer, by adaptive filtering comprising:

providing, by a variable filter comprising configurable filter coefficients, an estimate of said feedback and providing a current estimate of said feedback in dependence of a current variable filter input signal;

adaptively providing updated filter coefficients to said variable filter in dependence of first and second algorithm input signals; and combining said current estimate of feedback with the electric input signal and providing the feedback corrected input signal;

wherein the first and second algorithm input signals are the feedback corrected input signal and the processed signal, respectively; and attenuating or cancelling sound directly propagated via a direct propagation path from said environment to said eardrum of the user, by filtering comprising:

providing a cancellation signal of said directly propagated sound in dependence of a current filter input signal, and combining said cancellation signal of said directly propagated sound with said processed signal, and providing said noise cancelled signal, wherein:

said current variable filter input signal is said noise cancelled signal; and said current filter input signal is said feedback corrected input signal.

12. A method according to claim 11 wherein said current variable filter input signal is a signal comprising said processed signal compensated by the cancellation signal filtered by the feedback path or its estimate.

13. A computer program comprising instructions which, when the program is executed by a computer, cause the computer to carry out the method of claim 11.

* * * * *